(12) United States Patent
Arnaud

(10) Patent No.: US 6,797,179 B2
(45) Date of Patent: Sep. 28, 2004

(54) METHOD FOR REMOVING DISSOLVED METALS FROM WASTEWATER BY ELECTROCOAGULATION

(75) Inventor: Johnny Arnaud, Houston, TX (US)

(73) Assignee: Hydrotreat, Inc., Houston, TX (US)

( * ) Notice: Subject to any disclaimer, the term of this patent is extended or adjusted under 35 U.S.C. 154(b) by 0 days.

(21) Appl. No.: 10/428,583

(22) Filed: May 2, 2003

(65) Prior Publication Data

US 2003/0196938 A1 Oct. 23, 2003

Related U.S. Application Data

(62) Division of application No. 09/879,342, filed on Jun. 12, 2001, now Pat. No. 6,582,592.

(51) Int. Cl.[7] .............................................. C02F 1/463
(52) U.S. Cl. ...................... 210/709; 205/743; 205/745; 205/751; 210/717; 210/724; 210/742; 210/743; 210/748; 210/788
(58) Field of Search .......................... 204/228.1, 230.2, 204/237, 238, 240, 269, 661, 663, 665, 672; 205/743, 745, 751; 210/709, 717, 724, 741, 743, 787, 788, 742, 748

(56) References Cited

U.S. PATENT DOCUMENTS

| | | | |
|---|---|---|---|
| 3,849,281 A | 11/1974 | Bennett et al. ............. | 204/268 |
| 3,964,991 A | 6/1976 | Sullins ........................ | 204/275 |
| 4,124,480 A | 11/1978 | Stevenson ................... | 204/268 |
| 4,179,347 A | * 12/1979 | Krause et al. ............... | 205/743 |
| 4,235,698 A | 11/1980 | Arnaud ........................ | 204/302 |
| 4,329,211 A | 5/1982 | Plantes et al. .............. | 204/149 |
| 4,732,661 A | * 3/1988 | Wright .................... | 204/278.5 |

(List continued on next page.)

FOREIGN PATENT DOCUMENTS

DE 3641365 A1 12/1986

OTHER PUBLICATIONS

"Chemical Calculations An Introduction to the Use of Mathematics in Chemistry", Sidney W. Benson, University of Southern California.

(List continued on next page.)

*Primary Examiner*—Peter A. Hruskoci
(74) *Attorney, Agent, or Firm*—Howrey Simon; Arnold & White, LLP

(57) ABSTRACT

A system is provided for removing dissolved metals from industrial wastewater by electrocoagulation. The system includes an electrocoagulation reactor with a DC power supply having an insulation support enclosure with positive and negative electrode plates disposed thereon. The electrode plates are insulated for each other but remain in direct contact with the wastewater as it flows between the electrodes. The DC power supply induces opposite charges on alternate electrodes thereby generating an electric field between adjacent electrodes to cause the electrodes to ionize and go into solution for interaction with the contaminants in the wastewater as it flows through the reactor. The reactor is housed in a pressure vessel container so the exterior pressure on the reactor is higher than its internal pressure preventing leakage of fluids and oxygen and hydrogen gases produced in the reactor by decomposition of water. The pressure vessel allows higher operating pressures to retain higher concentrations of dissolved oxygen and hydrogen dispersed in the water for reaction with the contaminants. The electrical supply includes explosion proof connection housings for operation in hazardous environments. The system also includes a cyclone filter for separating the precipitated solid particles from the fluid and automatic control of the reactor by monitoring fluid flow, temperature, pH, and pressure.

21 Claims, 14 Drawing Sheets

U.S. PATENT DOCUMENTS

| | | | | |
|---|---|---|---|---|
| 4,906,361 A | | 3/1990 | Arnaud | 210/189 |
| 5,124,043 A | | 6/1992 | Arnaud | 210/675 |
| 5,314,589 A | * | 5/1994 | Hawley | 205/618 |
| 5,549,812 A | | 8/1996 | Witt a.k.a. Witte | 205/744 |
| 5,658,450 A | * | 8/1997 | Tamarkin | 205/745 |
| 5,928,493 A | * | 7/1999 | Morkovsky et al. | 205/757 |
| 6,210,575 B1 | * | 4/2001 | Chase et al. | 210/304 |
| 6,228,257 B1 | | 5/2001 | Arnaud | 210/189 |
| 6,346,197 B1 | * | 2/2002 | Stephenson et al. | 210/704 |

OTHER PUBLICATIONS

"Fundamentals Of *General Chemistry*", C. H. Sorum, University of Wisconsin.

"Field evaluation of arsenic and selenium removal by iron coprecipitation", D. T. Merrill; Journal WPCF, vol. 58, No. 1, Jan. 1986.

"*1998 Asme Boiler & Pressure Vessel Code, An International Code*"—The American Society of Mechanical Engineers.

* cited by examiner

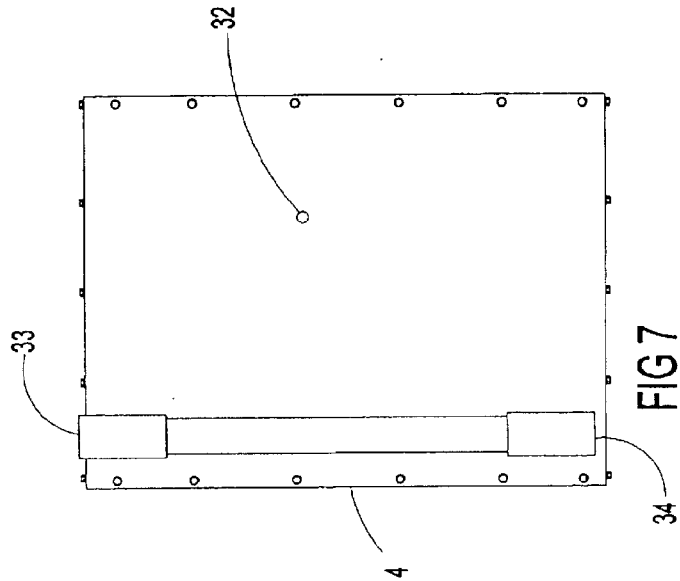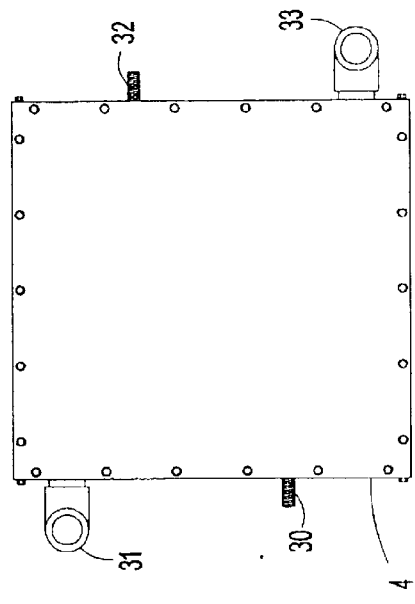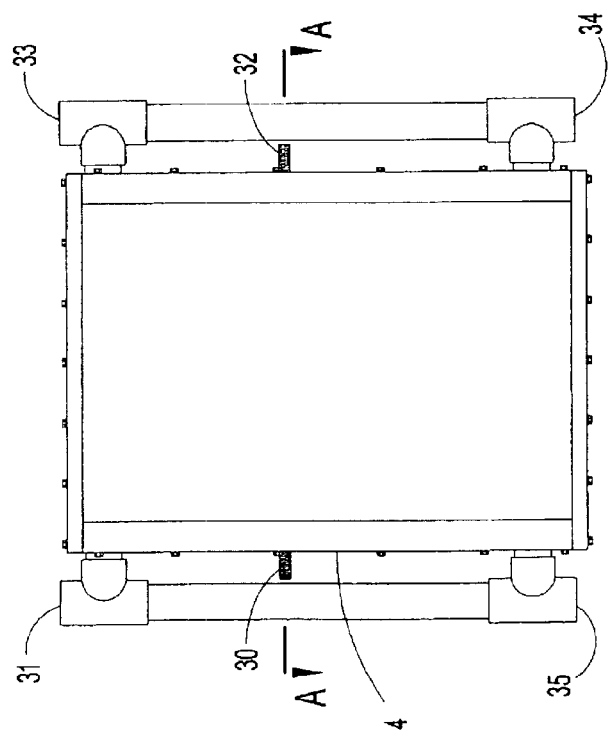

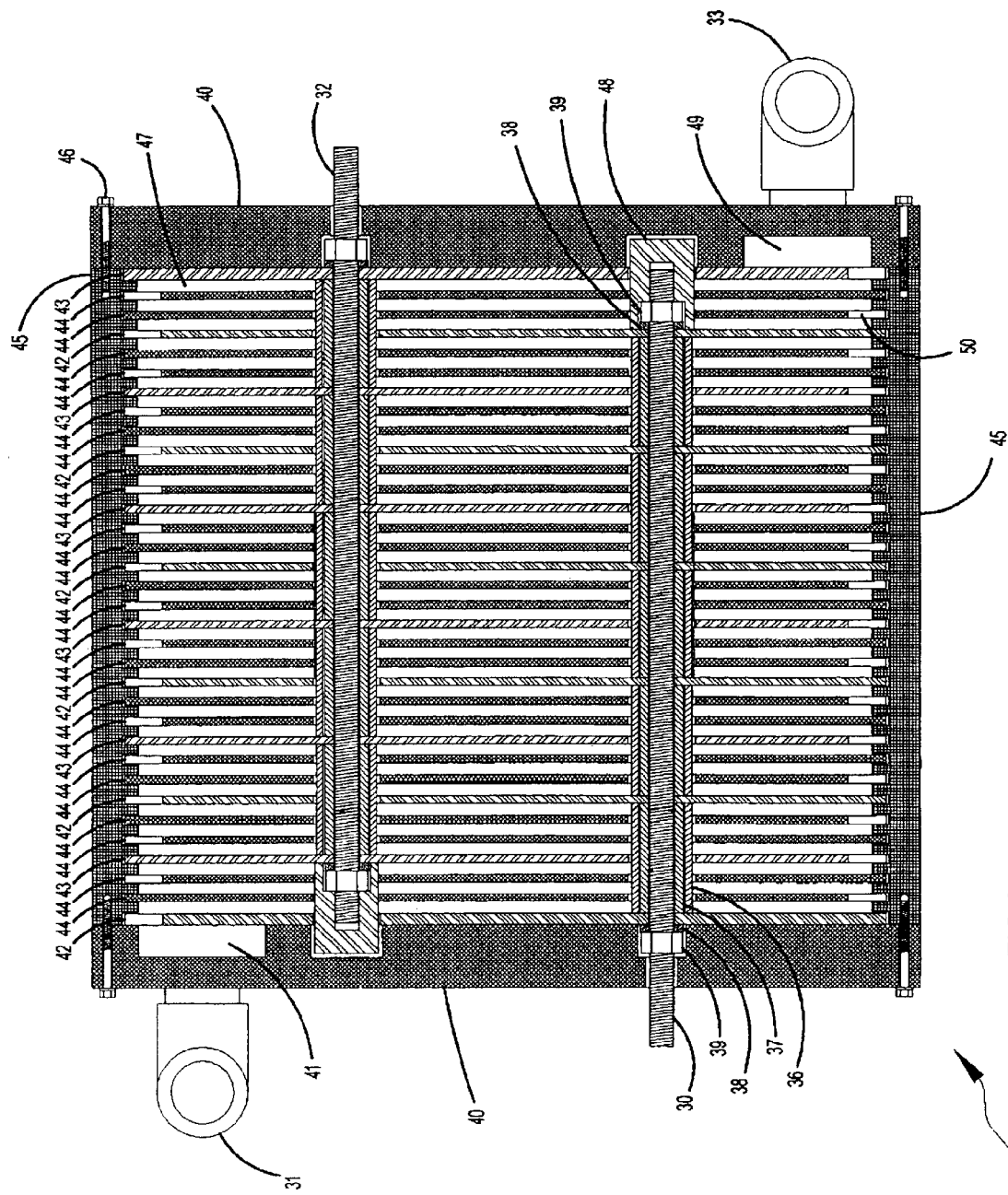

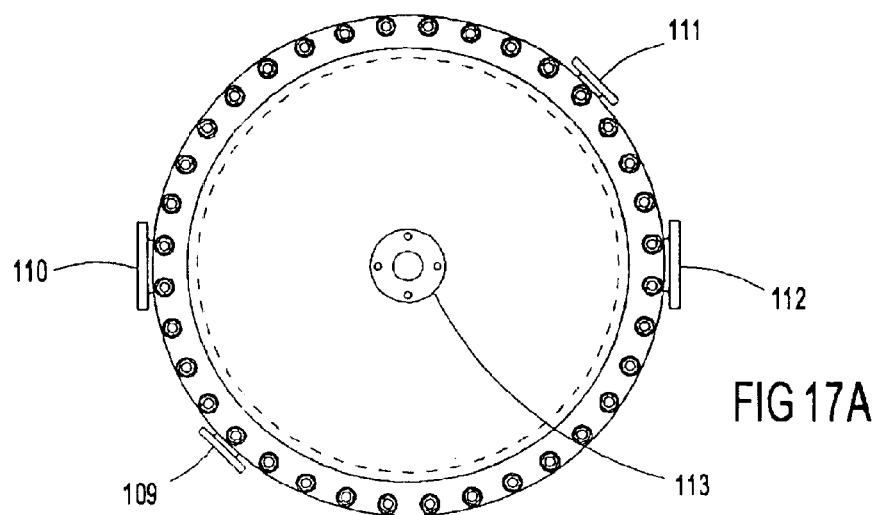
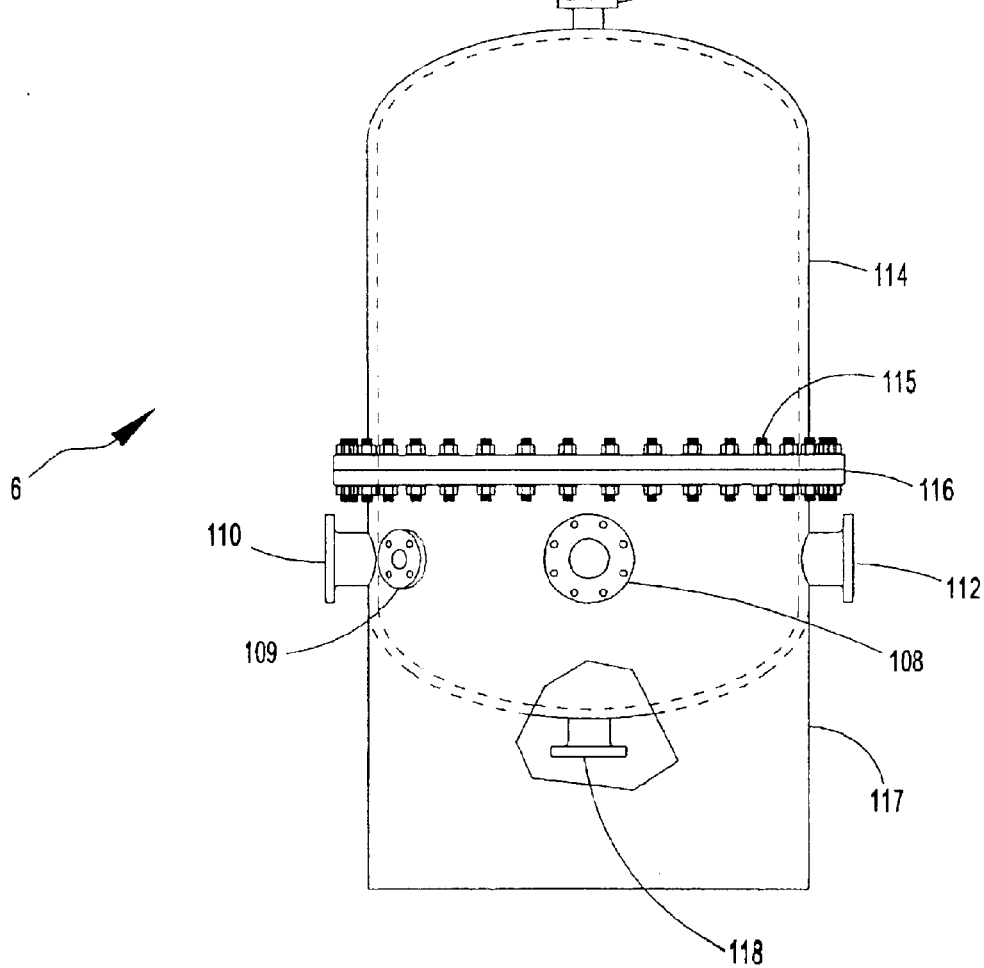
FIG 17A
FIG 17B

METHOD FOR REMOVING DISSOLVED METALS FROM WASTEWATER BY ELECTROCOAGULATION

CROSS-REFERENCE TO RELATED APPLICATIONS

This application is a divisional application of application Ser. No. 09/879,342, entitled "Apparatus for Removing Dissolved Metals from Wastewater by Electrocoagulation" by Johnny Arnaud, filed Jun. 12, 2001, now U.S. Pat. No. 6,582,592 which is hereby incorporated by reference in its entirety herein.

BACKGROUND OF THE INVENTION

1. Field of Invention

This invention relates to fluid treatment methods and apparatus for precipitation of metal ions, such as copper, nickel, cadmium, lead, zinc, and chromium, from fluids by chemical oxidation-reduction processes produced by electrolysis, commonly referred to as electrocoagulation (EC), and more particularly to electrocoagulation apparatus for dissolving replacement metals, such as iron and aluminum, by electrolysis to initiate the precipitation process and force the reactions to completion.

2. Description of Related Art

Organic compounds produced or used in industrial processes can contaminate the water used in the processes. Many industrial plants, such as petrochemical refineries and gas plants destroy the organic compounds in biological reactors before discharging the wastewater into public streams. Metals used in the processes, e.g. catalysts, and metals corroded from the stainless steel piping can also contaminate the wastewater. Wastewater contaminated with certain heavy metals cannot be introduced into the biological reactors because the metals kill the microorganisms that feed on the organic compounds. Thus, the metals must be precipitated and removed from the wastewater before the water is introduced into the biological reactors or discharged directly into public streams.

Governmental regulations restrict to very low levels the amount of contamination that can be discharged. Some of those low discharge levels dictated by regulation can be extremely difficult to reach using current systems. If the low limits of the regulations are exceeded, the fines for not complying with the discharge regulations can be substantial. Further, when the wastewater cannot be decontaminated in a timely fashion on the plant site to comply with the regulations, the water is hauled off to facilities specializing in wastewater processing or pumped down approved hazardous wastewater disposal wells. The regulations become even more restrictive if the hazardous wastewater is transported off the plant site where it is generated. The cost and accountability of transporting the wastewater off-site can become cost prohibitive. Some plants discharge hundreds and others even thousands of gallons per minute on a continuous 24-hours per day, 365-days per year basis. Similar wastewater issues are prevalent in other plants such as electric power plants or electroplating plants.

Electrical means have been used for some time to treat water and to reduce problems of encrustation or scaling due to mineral deposits. For instance, the present inventor invented such a system for treating water in an open re-circulating system as disclosed in U.S. Pat. No. 4,235,698, issued on Nov. 25, 1980. For that application, electrodes of the most inactive metals practical were selected for the apparatus on the basis of effectively treating the water only with the electrical signals without the electrodes going into solution.

Many attempts using various methods have been made to process wastewater on the sites where it is generated. Previous attempts to remove metals from wastewater have included electrocoagulation (a process where iron or aluminum plates, configured as sets of cascaded electrodes, are consumed by electrolysis as waste water passes over them) systems. It is known that typical electrocoagulation reactors employ electrodes of non-hazardous metals, such as iron ($Fe^{+++}$) and aluminum ($Al^{+++}$), that go into solution. Wastewater having hazardous metals is passed between the electrodes and a current is applied to the electrodes. The electrodes then form positive ions that can replace the ions of hazardous metals in compounds that keep them in-solution, so both the hazardous and non-hazardous metals can precipitate together (known as adsorption and co-precipitation). In this way, the metals are separated from the wastewater as solids.

The selection of the non-hazardous metals for the electrodes is based on several factors: availability and cost; their chemical activity relative to the hazardous metals to be removed indicated by their position in the chemical oxidation potential tables; the ease at which they can be ionized by electrical means in accordance with Faraday's Law; the ability to concentrate them and increase the reaction potentials due to concentration in accordance with the Nernst equation; the ease at which they can be removed from solution following the removal of the other metals either by precipitation or plating out of solution; and the ability of the apparatus used to affect and contain the reactions.

The present electrocoagulation systems have been deficient in a number of ways. For instance, with present EC systems, the amount of metal contamination cannot be reduced to the regulated discharge limits. Further, present EC reactors require relatively large electrode surface areas. To provide the large surface areas needed from material generally available on the market, rectangular or square plates are used for the electrodes in many units. Those EC reactors are typically enclosed on all six sides by six exterior insulating plates of plastic.

These plastic plates bow and the units become visibly deformed when subjected to even moderate pressures on the inside of the plates. Because of this distortion, the plastic plates are difficult to seal. The larger the plates the more difficult it is to seal them. Many of the units may not withstand the pressures needed to operate at the stated flowrate. These units then leak the electrically-charged wastewater. Thus, those units are typically restricted to relatively small sizes with relatively small side panels and low flow rates.

Present electrocoagulation reactors generate large amounts of oxygen and hydrogen gases, by decomposition of water. In general in many industries, potential sources of electrical ignition are carefully protected by sealing them with explosion proof housings. However, the existing electrocoagulation units are typically not explosion proof. Thus, present EC reactors may leak leading to a potential safety hazard for the people immediately around the units.

Pure iron is not generally available for the electrode plates, so the iron needed for the EC reactor is obtained from steel plates. Steel electrodes have imperfections that cause the electrical erosion of the plate not to be uniform. As a result, small chips fall off the plates. The chips are conductive and can short the electrodes if they are lodged between the plates. Current EC systems are susceptible to this shorting problem.

For instance, U.S. Pat. No. 5,928,493 to Morkovsky et al. discloses mounting the plates horizontally. Large plates mounted horizontally sag as they erode to go into solution. The erosion is not uniform and the plates touch each other electrically shorting out the EC reactor. Morkovsky also discloses an EC reactor with electrode plates alternately unsupported at one end. Wastewater flows around the unsupported ends of the electrical plates in the apparatus disclosed as it zigzags through the reactor. The unsupported ends of the plates are exposed to the larger areas of adjacent plates during the treating action. Further, being exposed to a larger cathode area (from both sides) causes an anode to deteriorate faster. Faster erosion of the smaller area only causes the deficiency to become worse. This action has the adverse consequence of accelerating the sagging of the unsupported end of the plate and shorting the life of the entire plate assembly.

Further, the Morkovsky system utilizes costly clarifiers and a de-foam tank, both of which increase the costs of removing the heavy metals from wastewater. These limitations may also limit the capacity of the electrocoagulation system.

German Patent Application DE 3641365A1, published Aug. 25, 1988, discloses an apparatus for the cleaning and treatment of contaminated water using the electrocoagulation process. Again, this process utilizes the disadvantageous horizontal electrodes and clarifiers.

Manzione et. al describe using adsorption and co-precipitation to remove hazardous metals in discharges from power plants in "Field Evaluation of Arsenic and Selenium Removal by Iron Co-precipitation," Journal WPCF, Vol. 58, No. 1 (January 1986). However, the process described therein added iron as a liquid compound, such as ferric chloride, instead of using the electrolysis with iron cathodes and anodes. The Manzione process also utilizes costly clarifiers to hold the wastewater until the metals precipitated out. Although the amount of time the solution is held in the clarifiers may vary, holding the solution adds cost to the process, as do the clarifiers themselves.

As shown above, multiple attempts to develop improved devices and processes for removing impurities from wastewater continue to be made. For the foregoing reasons, there is a need for an apparatus and method to remove contaminants from wastewater in a timely fashion. It is desired to have an apparatus and method of removing hazardous metals from wastewater that does not add chloride ions, and have a reactor that can withstand operational pressures without leaking. Further, it is desirable that the improved process and apparatus does not require including costly clarifiers nor require the holding of the wastewater for excessive periods to time. The desired system would not utilize holding or defoaming tanks—items which increase costs—and would utilize explosion-proof components. It is also desirable to have the throughput or capacity of present systems to increase such that wastewater would not need to be hauled off-site. The desired system should be able to utilize iron electrode plates without being susceptible to the shorting caused by iron bits. Finally, it is desirable to have the wastewater treatment process to be performed in real time.

It will become clear to those skilled in the art having the benefit of this disclosure that the methods and apparatus in accordance with the present invention overcome, or at least minimize, the deficiencies of existing electrocoagulation apparatus and methods.

SUMMARY OF THE INVENTION

In some embodiments, the electrical fluid treating apparatus in accordance with the present invention removes metal contamination from aqueous fluids, such as wastewater, by precipitation in chemical oxidation-reduction reactions employing electrolysis to comply with government regulations for discharge into public streams. In some aspects, the present invention further enhances the fluid treatment by increasing the pressure under which the fluid is treated, providing an increase in dissolved oxygen and hydrogen gas exposure to the contaminants within the system during the treating process, and providing the pressure needed for separating the suspended solids from the fluid.

In other aspects, the electrical fluid treating apparatus of the present invention includes an electrocoagulation (EC) reactor, a direct current (DC) electrical power supply, a pressure vessel container for the EC reactor, a system pressure pump, valves and piping to direct the flow of fluid, and a monitoring and control system, and a cyclone filter.

The EC reactor of some embodiments of the present invention includes a support enclosure having multiple electrode plates disposed thereon. The electrode plates are insulated from each other; however, the electrodes remain in direct contact with the fluid as it flows between the electrodes. A DC power supply is provided to induce opposite charges on alternate electrodes thereby generating a strong electric field between adjacent electrodes to cause the electrodes to ionize and go into solution for interaction with the contaminants in the fluid as it flows through the apparatus. An embodiment of the fluid treating apparatus in accordance with the present invention includes parallel plate electrodes disposed on the support enclosure so as to be parallel with the direction of fluid flow between the electrode plates.

An alternate embodiment of the device in accordance with the present invention includes parallel electrode plates with apertures in the plates disposed on the support enclosure located so as to be in a traverse relationship to the fluid flow where the fluid flows through the apertures in the electrodes. The EC reactor of some embodiments of the present invention may be positioned in a pressurized container, where the exterior pressure on the EC reactor is higher than its internal pressure.

The DC electrical power supply of some embodiments of the present invention includes automatic adjustment of the voltage to provide a constant preset current and automatically reverses the direction of current at adjustable preset intervals. The DC electrical power supply can be housed on an explosion proof housing and can be operated by a remote control and monitoring system.

The container of the present invention includes a horizontal flange around the diameter to divide the vessel into a lower section and a removal upper section that serves as a cover. The lower section of the container includes a support structure on which the EC reactor is positioned. An embodiment of the container is classified as a pressure vessel in accordance with the ASME Pressure Vessel Code Section X Class I or Class II capable of operating at various pressure ranges, such as from 10 to 100 psig. The pressure vessel of some embodiments is made from high temperature fiber reinforced plastic capable of resisting a variety of acids, bases, and solvents. The plastic material does not conduct electricity. A number of flange connections are provided in the pressure vessel to allow fluid to flow in and out as it is being treated, to drain the vessel, to vent gases during operation, allow air to enter the vessel during draining, and to supply electrical power.

In some aspects, the system pump of the present invention supplies the fluid to be treated at the pressure and flow rate the EC system is to be operated.

The valves and piping of some embodiments of the present invention direct the flow of fluid through the EC system. The valves are operated by the monitoring and control system. Valves and piping are made of materials that do not conduct electricity.

The monitoring and control system of some aspects of the present invention includes a programmable logic controller; sensors mounted in the outlet piping for flow, temperature, pressure, and pH; and interconnecting wiring. The controller can be mounted in an explosion proof housing. In some embodiments, a cyclone filter is utilized to separate solid contaminants from clean wastewater.

BRIEF DESCRIPTION OF THE DRAWINGS

Other objects and advantages of the invention will become apparent upon reading the detailed description that follows and upon reference to the drawings on which:

FIG. 1 provides the fluid diagram with an open pressure vessel to illustrate fluid flow in components housed inside the vessel. FIG. 2 provides the fluid diagram with the pressure vessel cover installed to illustrate fluid flow from the vent on top of the vessel.

FIGS. 5–7 are the top, front and back, and side views, respectively, of an embodiment of an electrocoagulation reactor apparatus in accordance with the present invention identifying the location of exterior components.

FIG. 8 is a cross sectional view of the apparatus illustrated in FIGS. 5–7 showing the arrangement of electrode plates inside the apparatus.

FIG. 9 illustrates the wastewater as it flows between two electrode plates with one plate at an electrically positive polarity and the other negative. FIG. 10 shows a reversal of electrical polarity in the two electrode plates of the cell. FIG. 11 shows a reversal of the direction of fluid flow between the electrode plates. FIG. 12 shows a non-powered or dummy or sacrificial electrode plate inserted between the positively and negatively powered electrode plates to increase the flow path in a single cell.

FIGS. 17–19 illustrate a pressure vessel container in accordance with the present invention for housing the electrocoagulation reactor apparatus under pressure. FIGS. 17A and 17B show top and side views of the pressure vessel container identifying components. FIG. 19 shows a top view of an open pressure vessel container with an electrocoagulation reactor positioned in the vessel.

Figure 1:
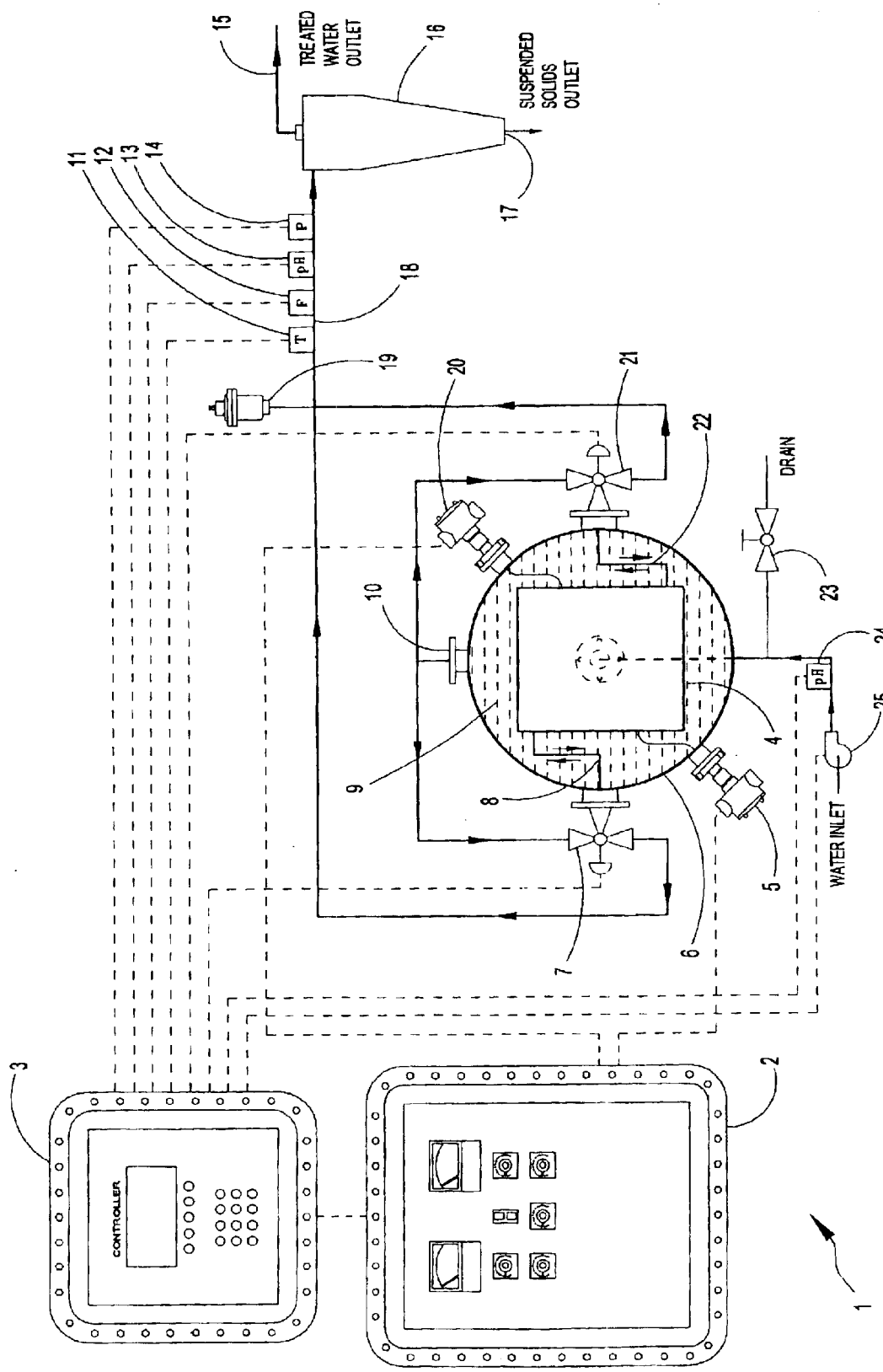
FIGS. 1 and 2 are fluid diagrams of an embodiment of an electrocoagulation fluid treatment system in accordance with the present invention in which a pressure vessel is employed to retain system operating pressure.

While the invention is susceptible to various modifications and alternative forms, specific embodiments have been shown by way of example in the drawings and will be described in detail herein. However, it should be understood that the invention is not intended to be limited to the particular forms disclosed. Rather, the intention is to cover all modifications, equivalents, and alternatives falling within the spirit and scope of the invention as defined by the appended claims.

DESCRIPTION OF ILLUSTRATIVE EMBODIMENTS

Illustrative embodiments of the invention are described below as they might be employed in the treatment of wastewater using electrolysis. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Further aspects and advantages of the various embodiments of the invention will become apparent from consideration of the following description and drawings.

FIG. 1 depicts in schematic illustration a flow diagram of an exemplary electrocoagulation (EC) fluid treatment system 1 in accordance with one embodiment of the present invention. The EC fluid treatment system 1 consists of an EC reactor 4 positioned in a pressure vessel container 6 with its cover removed, two three-way valves 7 and 21 to direct the flow of wastewater through the EC reactor 4, a system pump 25, a temperature sensor 11, a flow sensor 12, two pH sensors 13 and 24, a pressure sensor 14, a cyclone filter 16, a gas release valve 19, a direct current electrical power supply 2 in an explosion proof housing, a controller 3 in an explosion proof housing, and two explosion proof electrical connector housing assemblies 5 and 20, and a drain valve 23.

Figure 2:
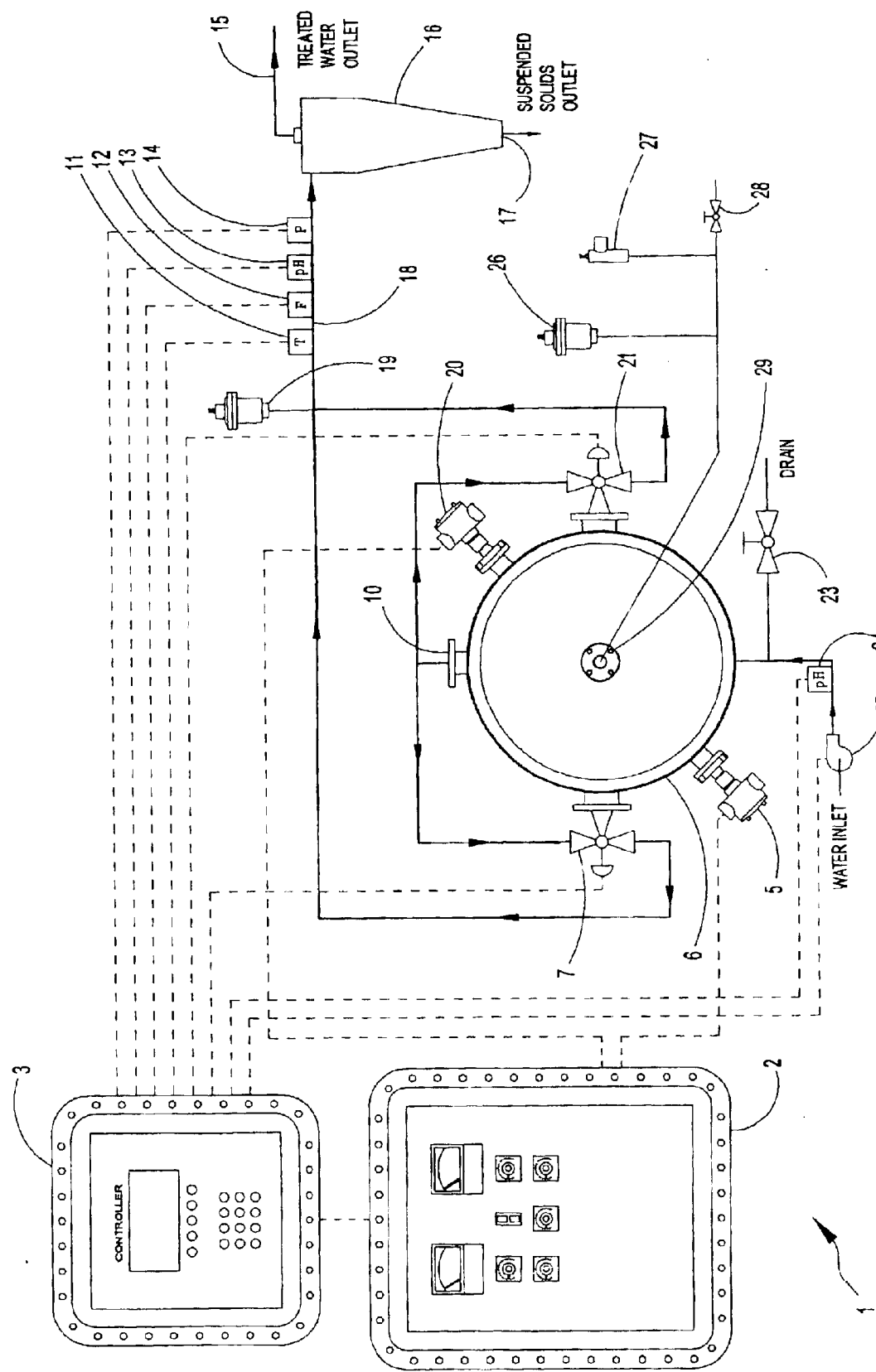

Referring to FIG. 2, therein is depicted the same system illustrated in FIG. 1 with the cover of the pressure vessel container 6 installed to illustrate the flange 29 on top of the vessel 6, a gas release valve 26 to remove air and other gases inside the vessel, a pressure relief valve 27 to prevent the vessel from exceeding the maximum operating pressure, and a manual vent valve 28 to be opened when draining the system.

Referring again to FIG. 1, in operation the wastewater 9 to be treated enters through the system pump 25 where the wastewater is increased to system operating pressure and flow rate. The system will typically operate at pressures from 10 to over 100 pounds per square inch (p.s.i.g.) above atmosphere. The operating pressure is dictated by the amount of dissolved oxygen and hydrogen gases needed to be dispersed in the wastewater for reaction with the contaminants contained in the wastewater and by whether dissolved gases are needed in subsequence operations. Therefore, the operating pressure of the EC system is adjusted to obtain sufficient dissolved oxygen and hydrogen gases needed for reaction with the amount of contaminants in the wastewater and what is needed for operations downstream of the EC reactor.

The wastewater 9 flows from the system pump 25 past a pH sensor 24 and into the container 6 through the bottom flange. The inlet pH is used for comparison with the outlet pH as an indication of the effectiveness of the treatment. Wastewater flowing through the container 6 flows around the EC reactor to keep the outside of the reactor cool and prevent accumulation of heat in the vessel. The wastewater flows out of the vessel 6 through flange 10 and flows alternately in one direction then the other selected by the controller by positioning the 3-way valves 7 and 21.

In one position, wastewater exits container 6, passes through valve 21, through piping 22, and into reactor 4. Once treated, wastewater exits reactor 4 via piping 8, through valve 7, and on to cyclone filter 16 via outlet piping 18.

Direct current electrical power is supplied and periodically reversed by the DC power supply 2 through explosion proof electrical connector housing assemblies 5 and 20. The treated water flows out of the EC reactor, and excess gases exceeding the saturation of the water are taken out of the system by the gas release valve 19. The water flows through the outlet piping 18 and by sensors for temperature 11, flow 12, pH 13, and pressure 14 that are monitored by the controller 3.

If an indication of temperature, flow, or pressure is detected to be out of the preset range, the controller 3 automatically shuts down the EC system 1 and sounds an alarm. The difference in pH of the incoming and outgoing water can be used to automatically adjust the electrical power supplied to the EC reactor 4. The pH either increases or decreases depending on the general chemistry of the wastewater being treated and the reactions of the other elements remaining in the water after the metals are precipitated.

Once precipitated, the solids have to be separated from the wastewater. Because reactor 4 is enclosed in container 6, the reactor 4 may be operated at a high enough pressure such that some of the gases generated by the electrocoagulation process is dissolved in the wastewater. Dissolved oxygen and hydrogen gases dispersed throughout the wastewater become available to participate in the chemical oxidation-reduction reactions. The amount of dissolved gases needed to saturate the wastewater depends on the pressure of the water. The gases in the EC reactors exceeding the saturation point of the water can be removed from the fluid by a pressure release valve 19.

The treated fluid under pressure allows the use of cyclone filter 16 to separate the suspended solids precipitated in the treating process, as discussed more fully hereinafter. While the present invention may be used with a clarifier if desired, the present cyclone filter of the disclosed electrocoagulation treating system does not require a clarifier and greatly reduces the cost of the entire treating system.

By increasing the power applied to the EC reactor 4 and operating at a higher pressure, additional gases in excess of that required in the chemical reactions are retained as dissolved gases and released to come out of solution in the cyclone filter 16. The use of this cyclone filter therefore reduces the costs of EC reactor by eliminating the clarifier, if desired.

The cyclone filter 16 separates solid particles from fluids by centrifugal forces caused by the forced spiral vortex created when a fluid is injected at high velocity into one end perpendicular and at a tangent to a the cylinder in which the fluid circulation occurs. The solid particles with a density greater than the fluid are forced to the outside against the cylinder wall as the fluid spirals downward where they are separated as an underflow out of the cylinder with the fluids (both liquids and gases) reversing direction and flowing out the top of the filter housing.

Figure 3:
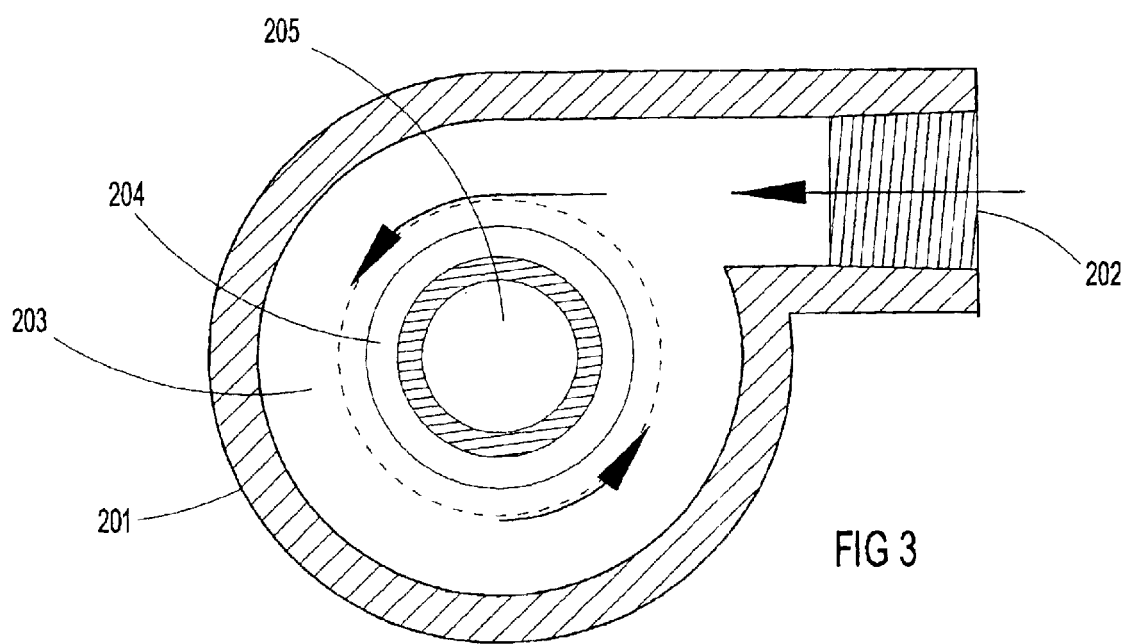
FIG. 3 shows a cyclone filter.
Figure 4A:
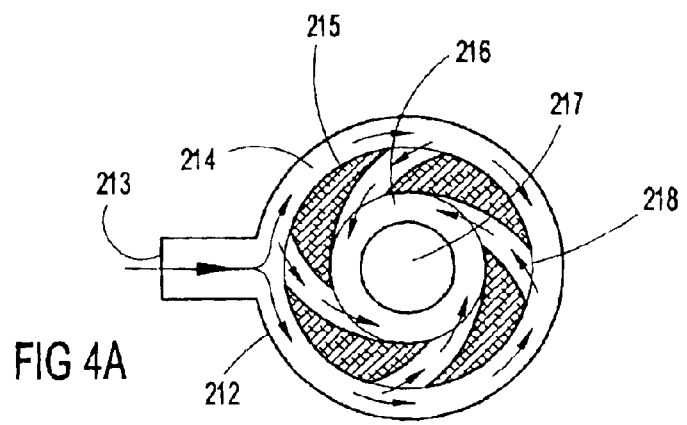
FIGS. 4A and 4B show a grooved ring cyclone filter.
Figure 4B:
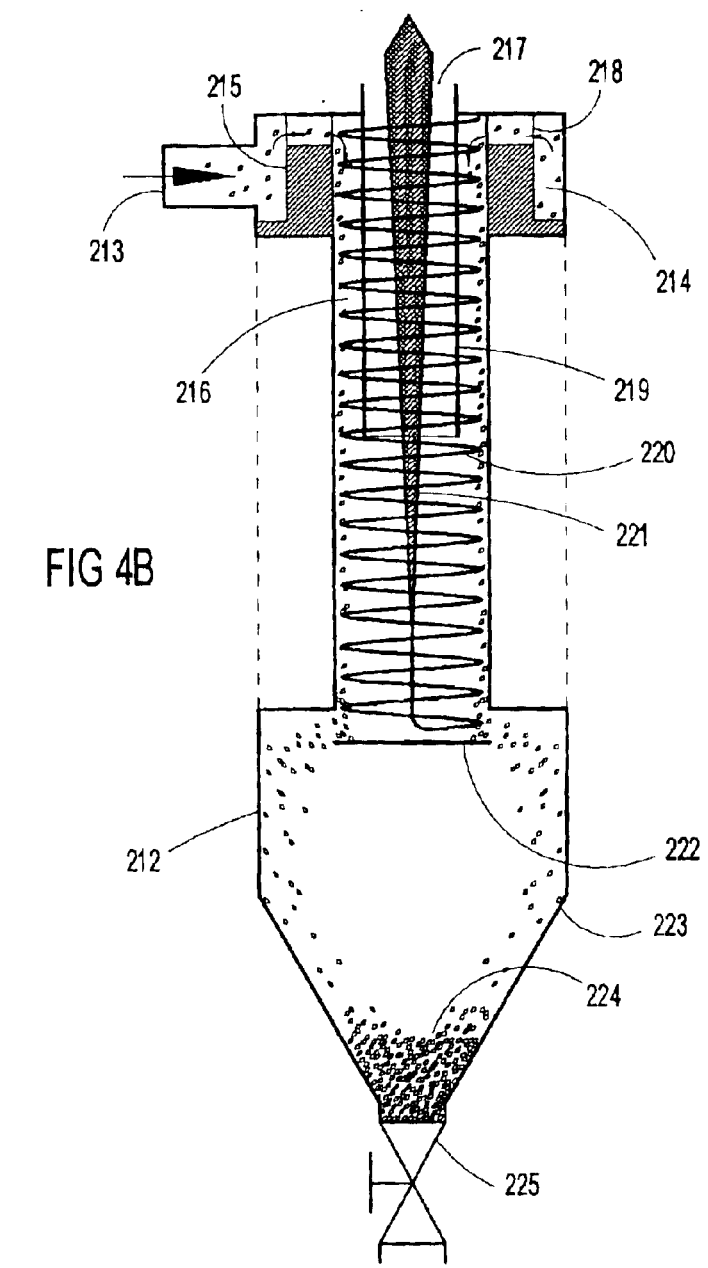

Cyclone filter 16 may be a typical cyclone filter as shown in FIG. 3 or may correspond structurally and functionally to the grooved ring cyclone filter disclosed in co-pending patent application Ser. No. 09/879,496, filed Jun. 12, 2001, in the name of Johnny Arnaud and assigned to the same assignee as the present application, as shown in FIG. 4. While the grooved ring cyclone filter 16 will be described herein in considerable detail, the for going co-pending application is hereby incorporated herein by reference and can be referred to for further structural detail. FIGS. 4A and 4B in the present application corresponds to FIGS. 4 and 5 in the foregoing co-pending application.

FIG. 3 is a schematic illustrating a typical cyclone filter. The horizontal flow at the inlet 202 of an exiting cyclone filter 201 may be used for separating suspended solids from the wastewater by using centrifugal force. The arrows indicate the direction of flow.

The general features of the cyclone filter 201 include an inlet 202, a circulation chamber 203, a vertical cylinder used as a down-flow annulus 204, and an inner cylinder to serve as an up-flow outlet 205. Wastewater from outlet piping 18 is injected at high velocity through inlet 202 into the circulation chamber 203 at a tangent to the inside diameter, where the wastewater is made to circulate or spin. The circulating wastewater flows downward into the down-flow annulus 204. The centrifugal force causes the heaviest materials in the circulating water to flow to the outside against the wall of the down-flow annulus 204 as the water spirals downward. The higher the horizontal component of the velocity, the smaller the particles that will migrate to the outside of the circulating stream at any given flowrate. Once against the wall of the down-flow annulus 204, the particles can be separated from the wastewater in the lower part of the filter and removed from the suspended solids outlet 17, as shown in FIGS. 1 and 2. Clean, treated water then exits the system through the top of the cyclone filter 15 as shown in FIGS. 1 and 2.

Referring to FIGS. 4A and 4B, a grooved ring cyclone filter is shown. The cyclone filter 212 consists of an inlet 213, a distribution channel 214, a spiral-grooved ring 215 with multiple spiral grooves 218, a down-flow annulus 216, a collection chamber 223 for the separated solids 224, a deflector 222, a vortex finder 219, and an outlet 217. FIG. 4A illustrates the horizontal flow of water as it enters the cyclone filter 212. The arrows indicate the direction of water flow.

Referring to FIG. 4A water containing the suspended particles to be removed enters the filter through the inlet 213 and flows into the distribution channel 214 and flows in both directions around the spiral-grooved ring 215. The water from the distribution channel 214 is then divided and flows into the four grooves 218 where its velocity is increased then injected into the down-flow annulus 216 and flows downward in a spiral motion. The suspended solids are separated from the water in the lower part of the filter, and the water flows upward and out of the filter through the outlet 217.

FIG. 4B illustrates the flow pattern of the water in a vertical schematic of the cyclone filter 212. Again, water containing the suspended solids to be removed enters the filter through inlet 213 and flows into the distribution channel 214 around the spiral-grooved ring 215. The circulating water flows through the spiral grooves 218 and is injected at a high velocity into the down-flow annulus 216 and flows downward in a spiral motion 220. The centrifugal force caused by the circulating water drives the suspended particles the outer diameter of the down-flow annulus 16 and causes a vortex 221 to form in the center. Although not required in some embodiments as described in the above-referenced copending application, a deflector 222 may be located in the lower part of the filter where the diameter is increased. The increase in diameter allows the solid particles to flow outward away from the down-flow annulus while the deflector 222 causes the water to reverse and flow upward in the lower pressure center of the stream and out through the outlet 217. The solid particles 224 accumulate in a collection chamber 223 in the lower part of the filter 212 below the deflector 222 and are periodically removed through the bottom outlet valve 225 (17 in FIGS. 1 and 2). Clean, treated water then exits the system through the top of the cyclone filter 15 as shown in FIGS. 1 and 2. Further, by changing the replaceable grooved disc, any desired fluid velocity can be obtained.

Referring to FIGS. 1 and 2 again, in operation, contaminated fluid (such as wastewater) enters the electrocoagulation system through a pump 25 by which system operating pressure and flow rate are established. The controller 3 monitors the pH of the incoming wastewater via pH sensor 24. The pressurized wastewater from the pump 25 enters the container 6 from the bottom and fills the area of the pressurized container 6 around the exterior of the EC reactor 4. The wastewater around the outside of the EC reactor 4 in the container 6 helps to keep the reactor 4 cool. A gas release valve 26 on top of the container 6 removes undissolved gases that accumulate in the container 6.

The wastewater then flows out of the container 6 via flange 10 into piping with two 3-way valves 7 and 21 that direct the flow of water back inside the container 6 and into the EC reactor 4 first from one direction then in the reverse direction, via piping 22 and 8. The wastewater is treated and the contaminating metals precipitated as it flows through the EC reactor as described in this specification.

The controller 3 monitors the flow, temperature, pressure, and pH of the treated wastewater as it leaves the EC reactor 4 and container 6 via temperature sensor 11, flow sensor 12, pressure sensor 14, and pH sensor 13. If desired levels are not met, the controller adjusts the flow rate of the wastewater or the voltage of the DC voltage source until the desired output levels are met.

Excess oxygen and hydrogen gases caused by disassociation of water in the EC reactor 4 and not dissolved are released to the atmosphere by a second gas release valve 19 mounted in the outlet line at a safe distance from the EC reactor 4. The dissolved gases remain in-solution and flow out with the treated wastewater to go come out of solution when the pressure is reduced in the center of the cyclone filter 16. The clarified wastewater flows out the top 15 and the solid particles flow out the bottom 17 of the cyclone filter 16.

Further, by using explosion proof fittings described above, the EC reactor and system is safer to operate and may be utilized at higher pressures. The rigid container 6 and the water surrounding the EC reactor 4 prevents the walls of the reactor from collapsing due to the large-surface-area electrodes. Therefore, this EC reactor may be utilized with higher flow rates and pressures than current reactors.

Further, although the present system may be used with a clarifier, the present system does not require the costly clarifier nor the holding tanks. Each of the aforementioned improvements reduces the overall cost of removing metals from wastewater.

An electrical coupling allows power to be supplied to the electrode plates through the insulated reactor. This electrical coupling comprises a threaded rod across and in electrical contact with the positively charged electrode plates having one end extending to the outside of the container. An electrical conducting spacer is located between each adjacent pair of electrode plates (positively charged). An insulating spacer covers the conducting spacer to insulate the threaded rod and the conducting spacer from the second electrode plates (negatively charged). A spring washer and a nut are screwed onto each end of the treated rod to compress the first plurality of planer electrodes together into a single electrically conducting unit. An insulating cap insulates the end of the threaded rod that remains inside the insulating enclosure of the electrocoagulation reactor from the second plurality of electrode plates (negatively charged). A second electrical coupling supplies power to the negative electrode plates.

Chemical, mechanical, and electrical factors are considered to achieve the requirements in the design of the EC reactor 4. The design of the EC reactor 4 is primarily directed to the end results of the action that the EC reactor has on the unit volume of the water that flows through it. All scientific parameters of the chemical considerations are well defined for the unit volume in chemistry textbooks and research reports known in the art. The replacement ions of aluminum and iron are generally selected because they are at a higher potential level in the standard oxidation potential tables than the other metals to be removed. The oxidation potential of an ion in-solution changes in relation to its concentration in the unit volume of water. The extent of the change in oxidation potential that is caused by concentration is determined by the Nernst equation. Once the theoretical level of concentration of the replacement ions needed in the unit volume of water is known, the theoretical method of achieving that requirement is then determined from Faraday's Law. The current density (amps per unit area) on the electrodes, the time of exposure to that current, the atomic weight of the electrode metal selected, and the unit volume of water in which the electrode ions are to be concentrated provide the theoretical amount of electrode ions from Faraday's Law that will be in-solution and available for the chemical oxidation-reduction reaction. The effectiveness and efficiency of a specific EC reactor treating specific wastewater can clearly be determined from chemical analysis of the water before and after treatment.

The mechanical considerations have to be directed at dissolving, concentrating, and dispersing sufficient electrode ions with the oxygen and hydrogen to support the chemical reactions to completion. To totally disperse the oxygen and hydrogen requires that they remain in-solution; therefore, the operating pressure becomes an important consideration. In addition, dispersing the electrode metal requires a high enough water velocity to carry the dissolved ions through the spaces in the EC reactor. Without sufficient velocity the electrode plate ions will continue to go into solution and thicken to form a gel and block part or all water flow.

The electrical requirements for operating the EC reactor are dictated by Faraday's Law. Generally, the current requirements are based on the total area over which the current is to be applied, the current density, and the time the water remains in the EC reactor. The voltage requirements are based on the distance between electrode plates, the conductivity of the water through which the current has to flow in the spaces between the electrodes, and the current density needed. If un-powered electrodes (dummy or sacrificial electrodes) are inserted between powered plates, the voltage applied between the powered electrode plates will be divided by the number of spaces created by the dummy plates (number of dummy plates plus one) between the powered electrode plates. The commercial direct current power supplies available from a number of manufacturers automatically adjust the voltage level required to furnish the preset amount of total current with automatic reversing of current direction at preset intervals.

FIGS. 5–8 depict an exemplary embodiment of an EC reactor 4 of the present invention capable of treating 75 to 100 gallons per minute (gpm) of wastewater. It should be clearly understood that indicating the flowrate of the EC reactor 4 illustrated is not intended to limit the size of the EC reactor embodiment in accordance with the present invention. A larger EC reactor embodiment of the present invention capable of treating 150 to 200 gpm of wastewater is made using the same base area (foot print) with twice the height that will fit into the same pressure vessel container as the 75–100 gpm reactors. Size limitation in existing apparatus is typically dictated by the ability to seal enclosures with flat exterior panels of insulating plastic materials. By placing EC reactors inside pressure vessel containers with the higher pressures on the outside of the reactors, there is no limitation of size dictated by the reactor apparatus.

FIG. 5 depicts a top view of an EC reactor 4 of the present invention identifying the location of electrical connectors 30 and 32 to be connected to an external DC power supply (not shown) and wastewater inlets and outlets 31 and 33 through which the direction of wastewater can be reversed.

FIG. 6 depicts a front or back elevation view of the EC reactor 4 identifying the location of electrical connectors 30 and 32, the reversible wastewater inlets and outlets 31 and 33, and the drains 34 and 35 to empty the reactor during service.

FIG. 7 depicts a side elevation view of the EC reactor 4 identifying the location of electrical connector 32, inlet-outlet 33, and drain 34.

FIG. 8 depicts a horizontal cross sectional view A—A of the EC reactor 4 taken from FIG. 6. The EC reactor 4 in this embodiment consists of 11 cells; 34 electrode plates 42, 43, and 44; 33 wastewater flow spaces 47 between the plates; an insulation enclosure with two side panels 40 and two end panels 45 made from machined plastic and held together by bolts 46; two electrical connectors 30 and 32; and inlet-outlet connections 31 and 33. Each cell consists of an anode electrode plate 42, two non-powered or "dummy" electrode plates 44, and a cathode electrode plate 43. It should be noted that while specific numbers of cells, plates and spaces are listed, any number could be utilized depending on the incoming wastewater and desire output.

The electrical connection 30 consists of a threaded bolt extending across all anode plates 42, conducting spacers 37 and insulation spacers 36 between anode plates 42, and spring washers 38 that maintain the compressive force applied on the assembly by the two nuts 39. An insulation cap 48 electrically insulates the end of the threaded connector 30 from the other plates. The threaded connector 30 extends out of the insulation panel 40 as a provision for connection to the external DC electrical power supply (not shown). The electrical connection 32 connects the cathode plates 43 in the same manner as described for the anode plate electrical connection 30. Channels 41 and 49 in insulation panels 40 act as manifolds to allow wastewater to flow from the spaces 47 between the plates and into the inlet-outlet connections 31 and 33. The wastewater flow is directed through the spaces 47 between the electrode plates in sequence by apertures 50 in alternating ends of the plates.

FIGS. 9–12 depict in simplified schematic representation of an electrocoagulation apparatus in accordance with the presentation invention to illustrate the principles of operation. The electrocoagulation apparatus 51 consists of one EC cell of two electrode plates 55 and 59, an electrical connector 57 coupled to electrode plate 55 through which the negative polarity of an external DC electrical power is supplied (not shown), an electrical connector 60 coupled to electrode plate 59 though which the positive polarity of the external DC electrical power is supplied, and a non-conducting enclosure 56.

The electrode plates 55 and 59 are made of either iron or aluminum. Apertures 52 and 58 allow the wastewater 54 to flow between the electrode plates 55 and 59 to be treated. The arrows 53 indicate the direction of wastewater 54 flow. As wastewater 54 flows between the electrode plates, the electrical power flows through the wastewater 54 from the positively charged (anode) electrode plate 59 to the negatively charged (cathode) electrode plate 55. The positively charged electrode plate 59 will go into solution, as positive ions ($Fe^{+++}$ or $Al^{+++}$), in proportion to the amount of electrical current that flows through the contaminated wastewater in accordance with Faraday's Law that is well understood by those skilled in the art. The chemical reactions that occur at the electrode plates and between the chemical compounds that contaminate the wastewater is also understood by those skilled in the art of chemical oxidation-reduction reactions and in the art of adsorption and coprecipitation.

Figure 10:
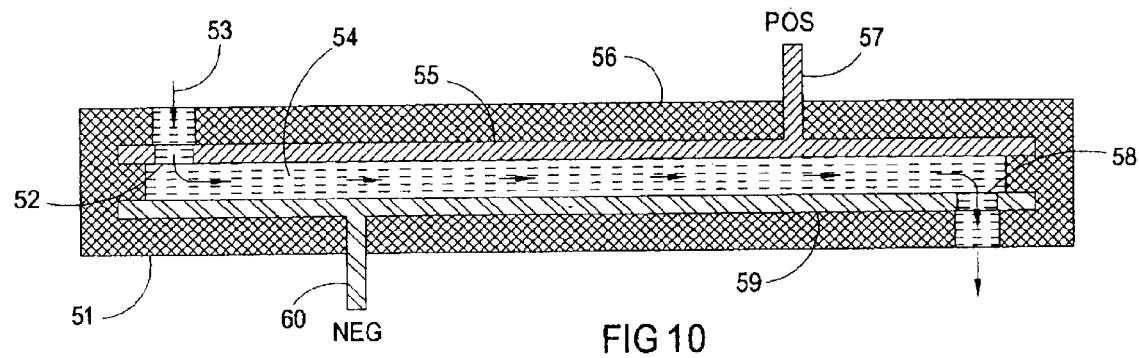

As previously disclosed, as the contaminated wastewater 54 enters the EC cell 51, positive ions from the anode go into solution and react with the compounds in the wastewater and all metals precipitate as solids. When the chemical reactions in the contaminated wastewater are completed, some of the excess ions (Fe or Al) from the anode come out of solution and plate out onto the cathode. Because the anode is the only electrode that deteriorates as it goes into solution, the polarity of the plates are periodically reversed to allow both electrode plates to deteriorate equally. FIG. 10 illustrates the reversal of polarity with electrode plate 55 changed to positive and electrode plate 59 changed to negative through use of a simple, off-the-shelf rectifier (not shown). Both the incoming contaminated wastewater and the outgoing treated water from the EC cell are chemically analyzed to determine the effectiveness of the treatment. The amount of direct current electrical power supplied and the flowrate of the wastewater are adjusted to minimize the amount of excess ions (Fe or Al) generated from the anode that remain in the treated water as it leaves the EC cell 51.

Figure 11:
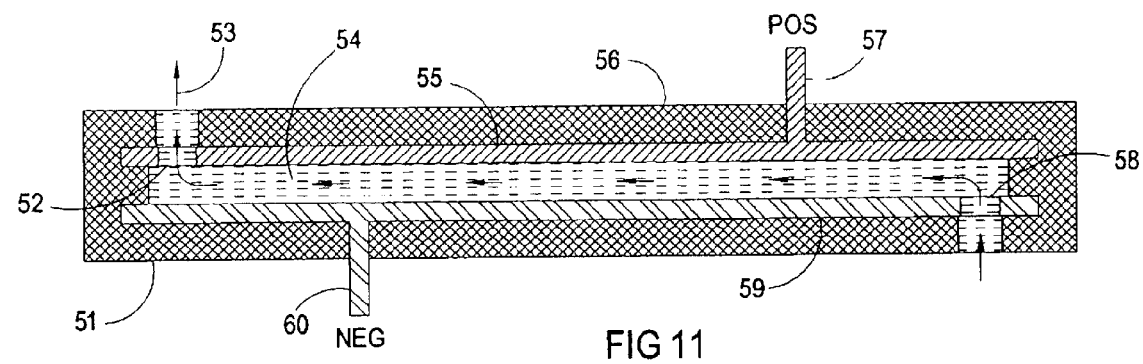

Most of the chemical reactions occur in the initial part of the EC cell 51, starting near where the contaminated wastewater 54 enters. The reactions are typically completed before leaving the EC cell 51. As a result the electrodes plates 54 and 59 deteriorate on the end where the wastewater 54 enters the cell. To minimize that problem the direction of wastewater flow through the EC cell is periodically reversed as illustrated in FIG. 11. The arrows 53 indicate the direction of water flow. The deteriorated electrode plates are periodically replaced.

Figure 9:
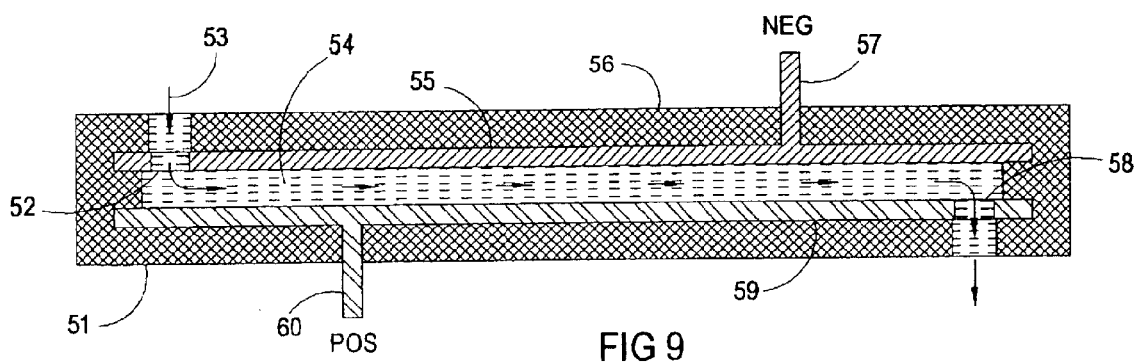
FIGS. 9–12 are simplified schematics of a single cell electrocoagulation device of an embodiment of the present invention illustrating the principles of operation.
Figure 12:
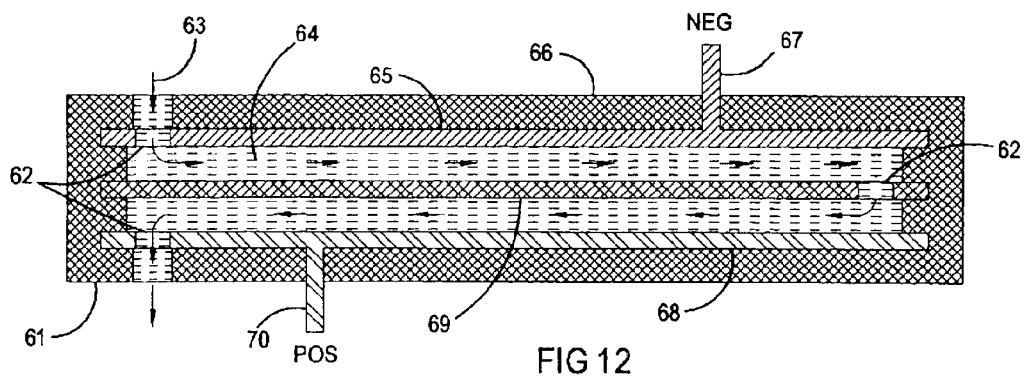

FIG. 12 depicts a schematic of an EC cell 61 that is a modification of the EC cell 51 in FIGS. 9–11. EC cell 61 consists of a negative electrode plate 65 (cathode) with an electrical connection 67 to the external electrical power supply (not shown), a positive electrode plate 68 (anode) with an electrical connection 70 to the external electrical power supply, a dummy electrode plate 69 with no external electrical connection, and an electrical insulation enclosure 66. The number of dummy plates that can be added depends on the conductivity of the wastewater to be treated and the voltage available from the electrical power supply (not shown). The dummy electrode plates increase the length of the flow path through which the wastewater travels while being treated and increases the treating time. The apertures 62 in the electrode plates 65, 68, and 69 are arranged to direct the flow of contaminated wastewater 64 in sequence between the cathode and dummy electrode plates 65 and 69 respectively then between the anode and dummy electrode plates 68 and 69 respectively. The arrows 63 indicate the direction of wastewater 64 flow. Current flows from the anode 68 to the cathode 65 through the dummy electrode plate 69. The side of the dummy electrode plate 69 facing the cathode 65 becomes positive with respect to the cathode 65 and goes into solution on that side of the plate. The side of the dummy electrode plate 69 facing the anode 68 becomes negative with respect to the anode 68. When the electrical current is reversed the functions of the positive and negative sides of the dummy electrode plate 69 are also reversed with respect to the two other electrode plates 65 and 68.

Figure 13:
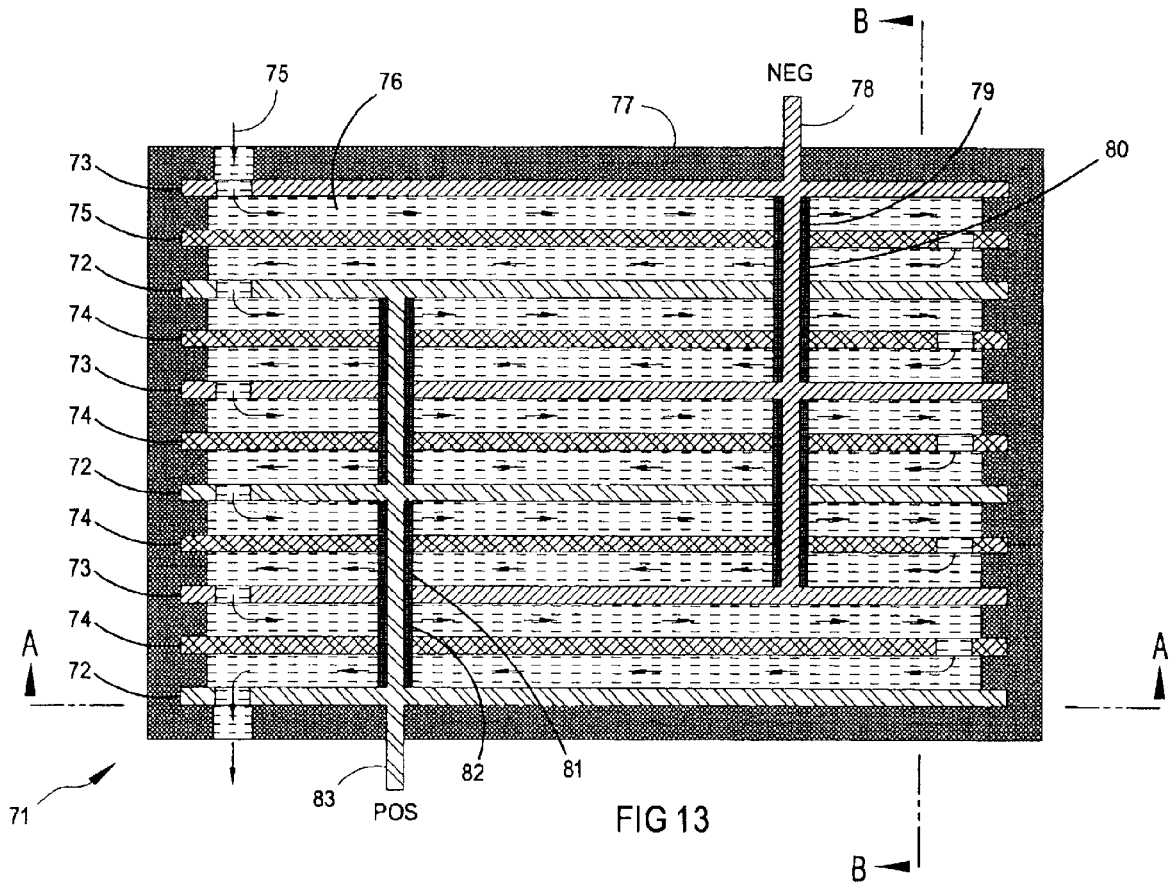
FIG. 13 is a simplified schematic of a multi-cell electrocoagulation device in accordance with an embodiment of the present invention illustrating the principles of operation.

FIG. 13 provides a simplified schematic of an exemplary multi-cell EC reactor 71 of the present invention to illustrate operating principles. The EC reactor 71 consists of three anodes 72, three cathodes 73, five dummy electrode plates 74, an electrical insulation enclosure 77, an interconnection 79 between the cathode plates 73 insulated 80 from the other plates, and an interconnection 82 between the anode plates 72 insulated 81 from the other plates. Each electrical cell consists of one side of an anode plate 72 facing a dummy plate 74, a dummy plate 74, and one side of a cathode plate 73 opposed to the anode. During treatment the wastewater 76 flows in the direction indicated by the arrows 75. In this embodiment, the EC reactor has five cells, 11 electrode plates, and 10 spaces between the plates through which the wastewater 76 flows as it is being treated. The electrical polarity and the direction of wastewater flow may be reversed to allow a more even deterioration of the plates.

Figure 14:
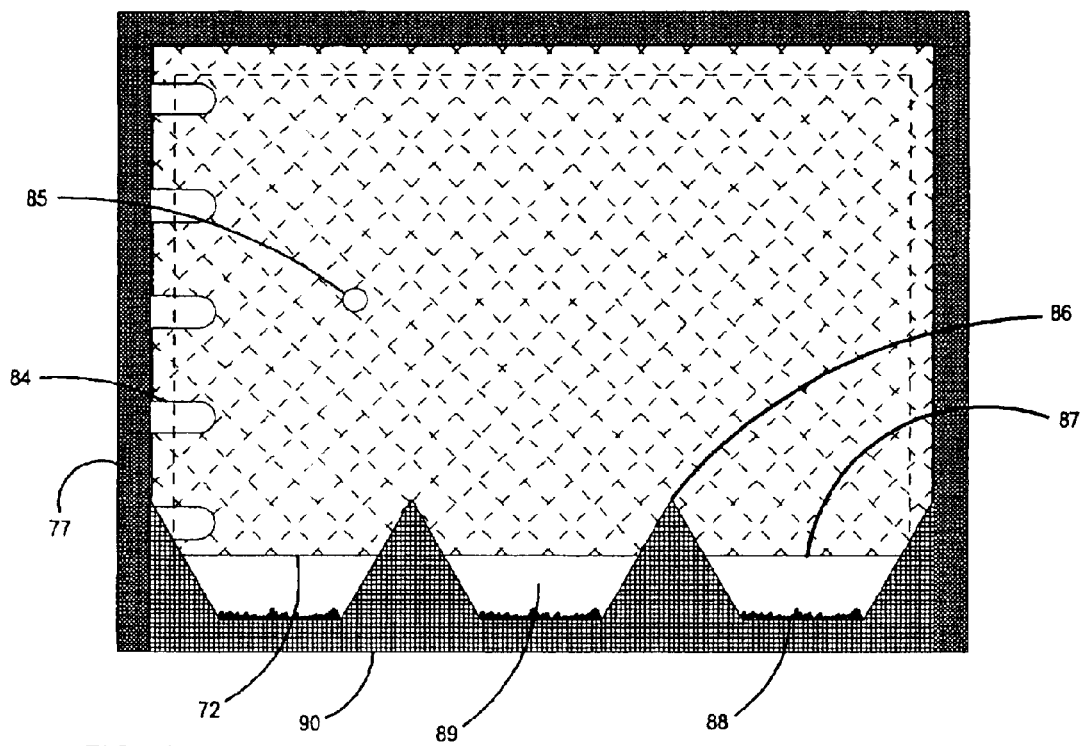
FIG. 14 is a vertical cross sectional view of the electrocoagulation device of FIG. 13 parallel to an electrode plate illustrating how a typical electrode plate is mounted in the apparatus on a support with spaces below the level of the plate to remove any chips that fall off the plate and removes them from the flow and electrical paths in the device.

FIG. 14 illustrates a vertical sectional view A—A taken from the exemplary EC rector of the present invention depicted in FIG. 13. FIG. 14 depicts a typical electrode plate 72 with apertures 84 through which the treated wastewater flows and 85 where the electrical connection is made. The apertures can be slots (as shown) or holes where the wastewater can flow through the plate and also allow the plate to be supported on the end to prevent warping. The total area of the apertures through the plate typically equals the vertical cross sectional area of spaces between the plates where the water flows to prevent a large pressure drop. Insulation 77 electrically insulates the electrode plate from other electrodes and retains the water within the spaces between the electrodes.

As mentioned previously, various problems result from the use of impure iron electrodes (that may result in iron chips shorting the electrodes) and bowing, horizontally-mounted plates. Vertically mounted plates do not sag; however, there is less space between vertical plates to disperse the small chips that fall off the plates. An electrically insulating electrode plate support structure 90 consisting of support ridges 87 on which the electrode plates 72 are positioned, triangle shaped spacers 86 that keep the electrode plates 72 on the support ridges 87 separated from each other, and recessed spaces 89 between and below the level of the electrode plates 72 on the support ridges 87 are provided to collect the chips 88 that fall off the plates and remove them from the electrical path between the electrode plates.

Figure 15:
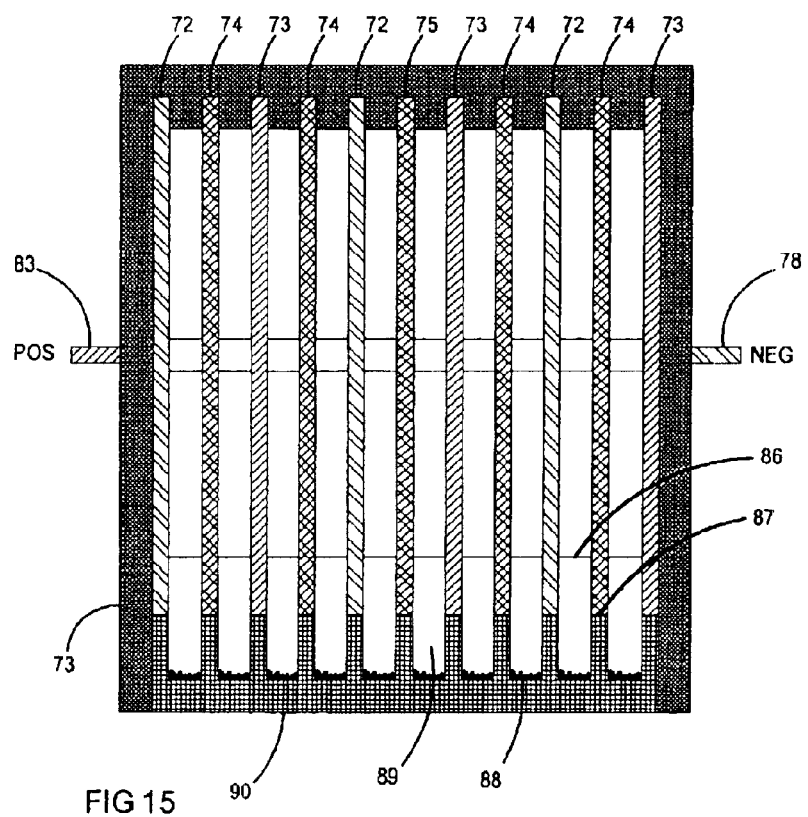
FIG. 15 is another vertical cross sectional view of the electrocoagulation device of FIG. 13 traverse to the electrode plates illustrating how the plates are supported across the device.

FIG. 15 depicts a vertical sectional view B—B taken from the exemplary EC reactor 71 of the present invention depicted in FIG. 13. FIG. 15 illustrates electrode plates 72, 73, and 74 positioned on the electrically insulating electrode plate support structure 90 with the support ridges 87, triangle shaped spacers 86, and recess spaces 89 where chips 88 that fall off the plates can clear the electrical paths and prevent shorting the electrodes.

Figure 16:
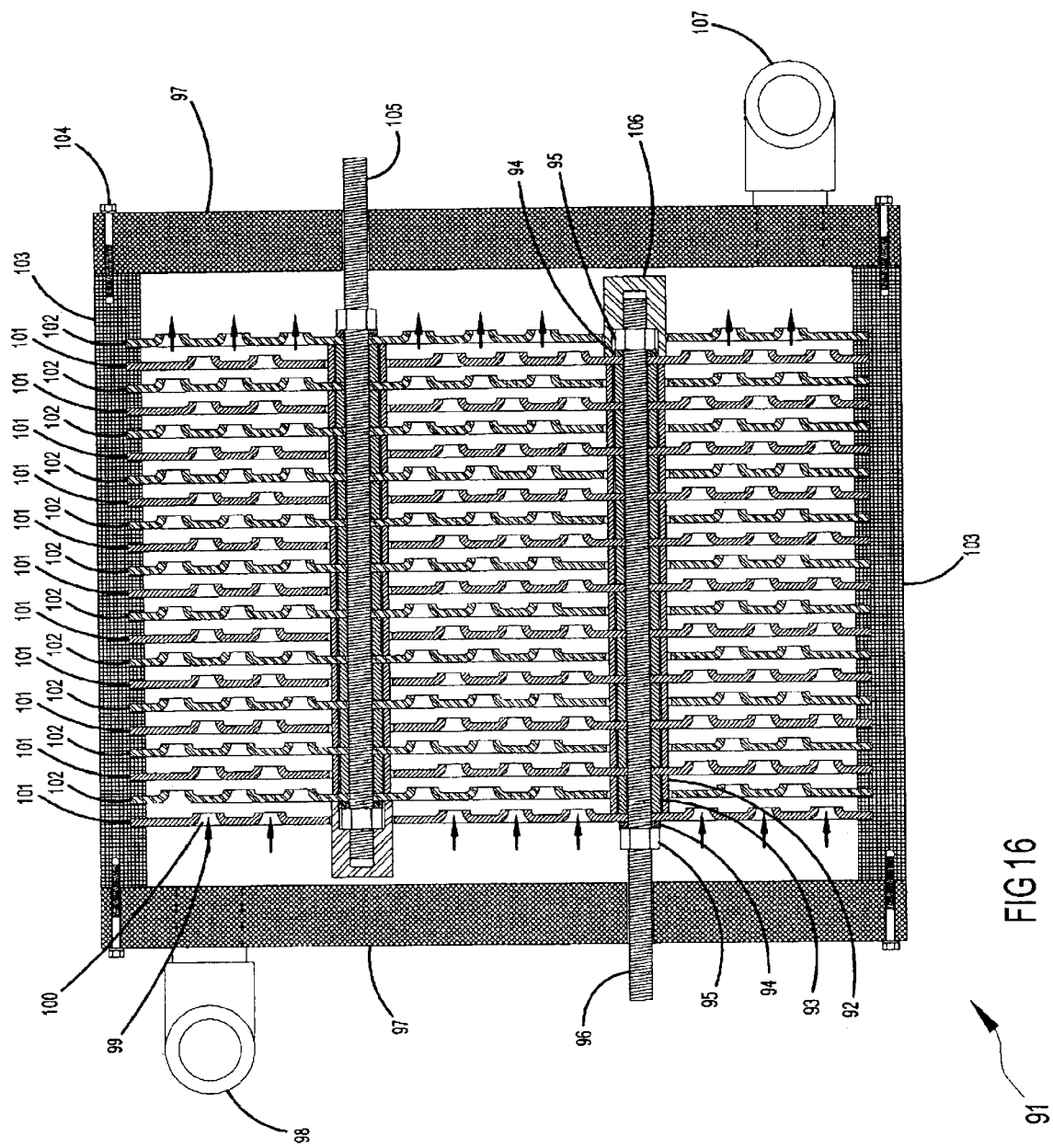
FIG. 16 is a horizontal cross sectional view of another embodiment of an electrocoagulation reactor apparatus of one embodiment of the present invention showing the arrangement of perforated electrode plates inside the device of FIGS. 5–7.

FIG. 16 depicts a cross sectional view of an exemplary embodiment of EC reactor 91 of the present invention. The illustration is another horizontal cross sectional view A—A of the EC reactor 4 taken from FIG. 6. The electrode plates 101 and 102 of this embodiment have apertures through which the wastewater to be treated flows. The electrode plates 101 and 102 can be punched or pierced. The outer configuration of the EC reactor 91 is the same as the EC reactor 4 depicted in FIG. 8. The EC reactor 91 consists of 21 cells with anode plates 101 and cathode plates 102. The reactor has no dummy electrode plates. The electrical connection 96 consists of a threaded bolt extending across all anode plates 101, conducting spacers 93 and insulation spacers 92 between anode plates 101, and spring washers 94 that maintain the compressive force applied on the assembly by the two nuts 95. An insulation cap 106 electrically insulates the end of the threaded connection 96 from the cathode plates 102. The electrical connection 105 connects the cathode plates 102 in a similar manner as described above for the anode plate connector 96. In operation wastewater enters the EC reactor 91 through the inlet 98 piping and flows through the apertures 100 in the electrode plates 101 and 102 in the direction indicated by the arrows 99. As the water flows through the apertures electrical power is conducted through the water causing the anode plates 101 to go into solution in accordance with Faraday's Law. The apertures in the anode plates become larger as the treating process progresses.

The polarity of the DC power is periodically reversed in order to alternate the deterioration of the plates. The primary chemical reactions occur at the plates. This results in an increase on the size of the apertures. The apertures are kept as small as possible to force the water to flow as close to the plates as possible. The increase in aperture size starts at the point where the wastewater enters the plates and progresses downstream over time. The wastewater is kept flowing in only one direction in this embodiment of the EC reactor. This allows water to flow through the larger apertures first and receive partial treatment in those larger apertures. The treatment is then completed as the water reaches the smaller aperture downstream. The inlet-outlet connections 98 and 107 are the same as described in the discussion associated with FIG. 18. The insulation enclosure is made from machined plastic panels 97 and 103, two each, held together by bolts 104. It is difficult to design an enclosure with flat plastic panels that is capable of holding high internals pressures without leaking. The embodiment in accordance with the present invention will hold high external pressures. The EC reactor is positioned in a pressurized container as disclosed in the discussion of FIG. 1 with the external pressure on the EC reactor higher than its internal pressure. With the higher fluid pressure on the outside of the EC reactor it is not necessary to completely seal the enclosure. Any minor leak that may occur allows water to flow into the EC reactor where it becomes mixed with other wastewater and treated.

Figure 18A:
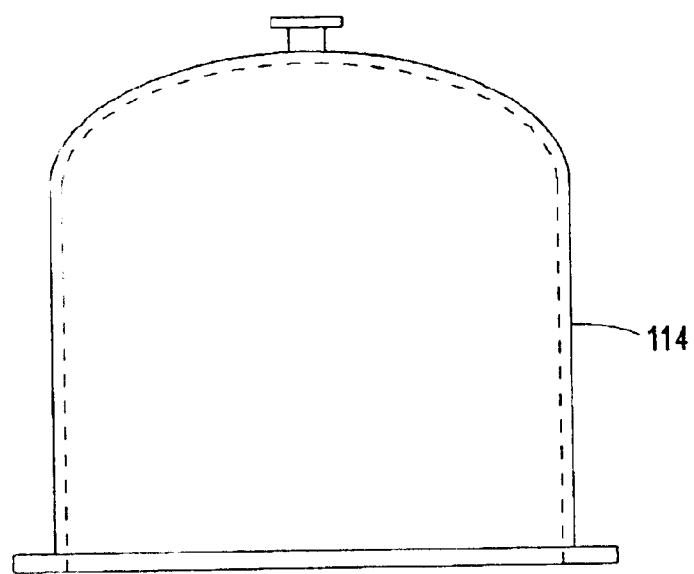
FIGS. 18A and 18B show a side view of an open pressure vessel container with the electrocoagulation reactor positioned in the vessel.
Figure 18B:
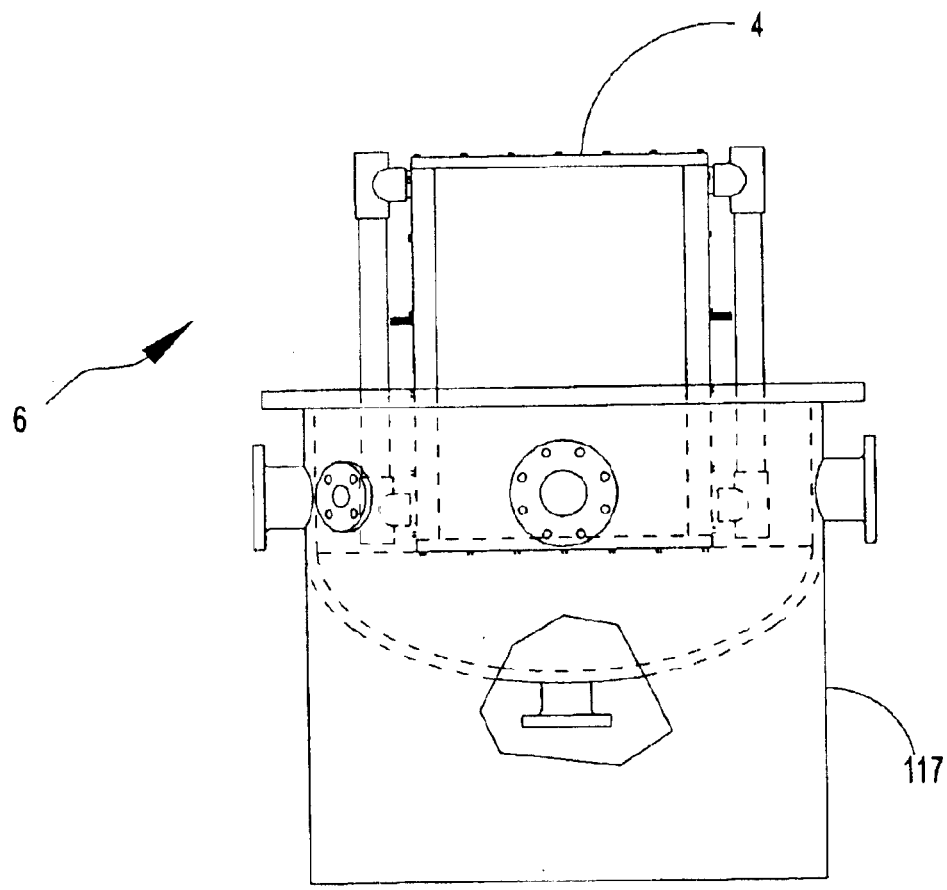
Figure 19:
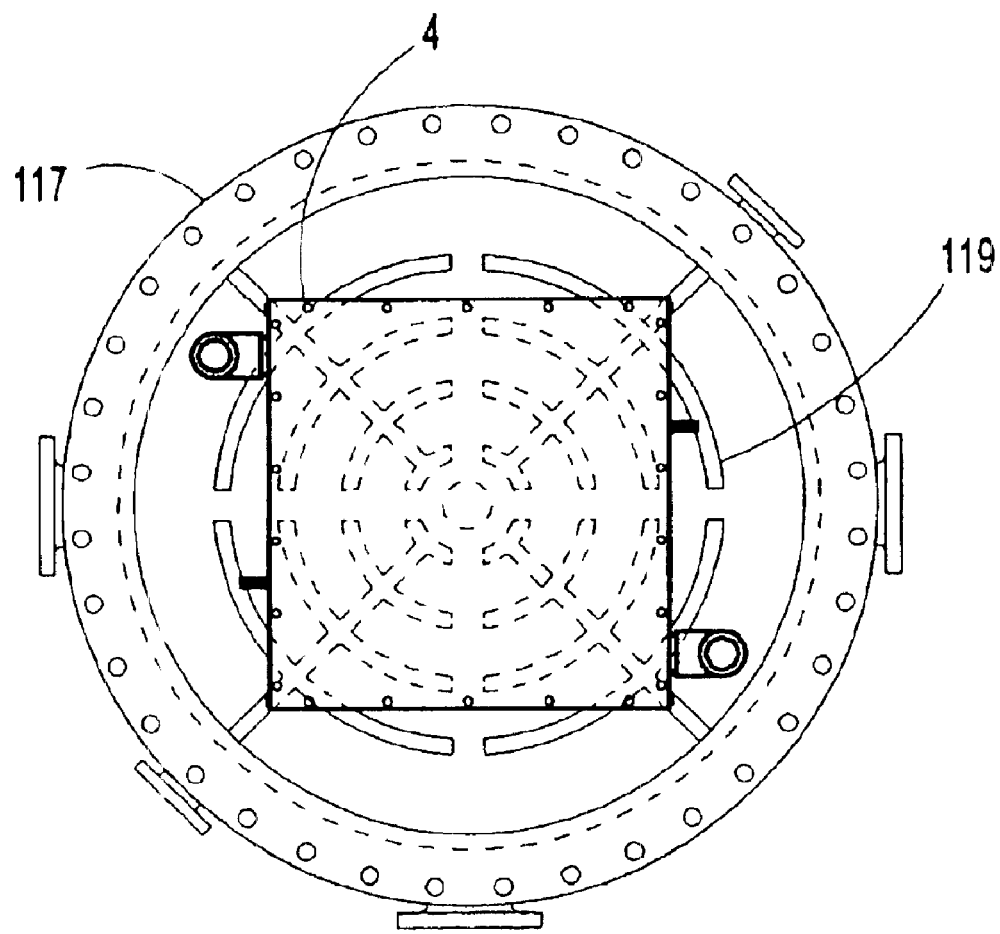

FIGS. 17–19 depict an exemplary embodiment of a pressure vessel container 6 for housing the EC reactor 4 under pressure in according with the present invention. The pressure vessel container is a non-conducting fiber reinforced plastic vessel that can be designed and manufactured in accordance to the requirements in Section 10 of the ASME Pressure Vessel Code when required in specific applications. Note that the use of the pressure vessel allows the EC reactor 4 to be larger for increased capacity, as the pressure vessel minimizes leakage from the unit.

FIGS. 17A and 17B depict top and side-elevation views of the pressure vessel container 6 of the present invention and identifies basic external components. The pressure vessel container 6 consists of lower section 117 with a cover 114. A horizontal flange 116 around the cylindrical part of the vessel 6 is provided to bolt 115 the cover 114 to the lower section 117 of the container 6. The container 6 has seven flanges 108–113 and 118 to allow wastewater to flow in and out of the vessel, vent the vessel, and connect the external electrical power. The specific function of each flange is disclosed in the fluid diagrams of FIGS. 1 and 2 and the following discussions.

FIGS. 18A and 18B depict the pressure vessel container 6 of the present invention with the cover 114 removed from the lower section 117 of the vessel. The EC reactor 4 is positioned in the lower section 117 of the container 6.

FIG. 19 depicts the lower section 117 of container 6 of the present invention with the cover removed illustrating a top view of EC reactor 4 positioned on the support 119 structure built into the lower section 117 of the container 6.

Figure 20:
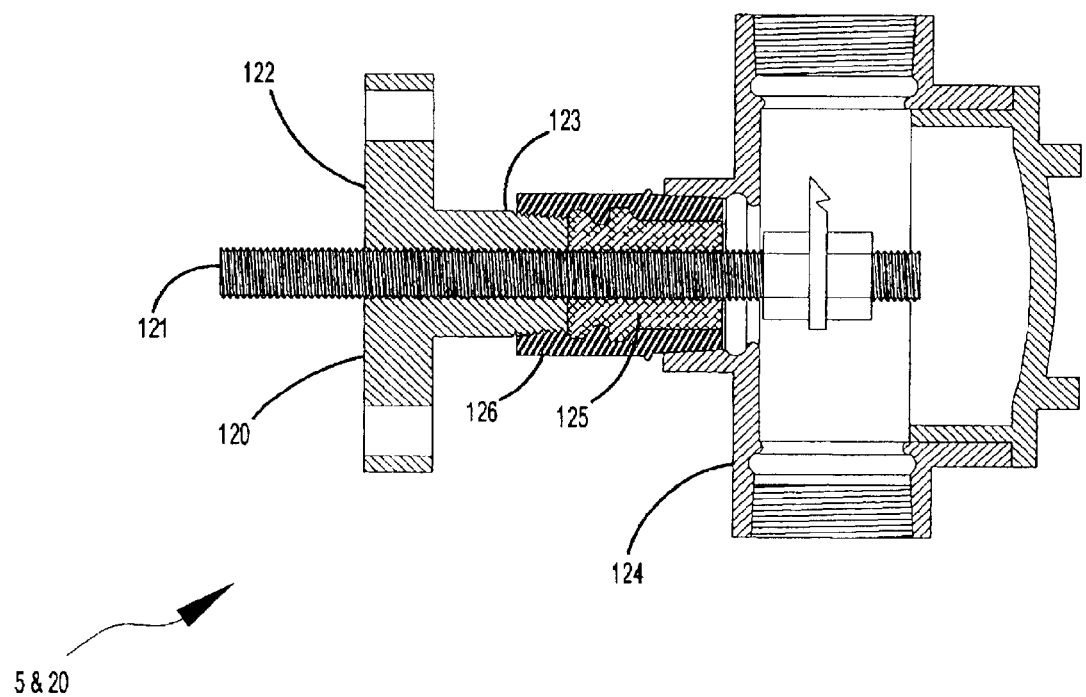
FIG. 20 is a sectional view of an electrical adapter assembly used to feed electrical power to the reactor inside the pressurized vessel with an explosion-proof housing.

FIG. 20 depicts an electrical adapter assembly 5 and 20 of the present invention consisting of the adapter 120 with a pipe flange 122, a male threaded pipe fitting 123, and a threaded connector 121, an explosion proof sealing hub 126, sealing compound 125, and an explosion proof conduit outlet housing 124 used to supply electrical power into the pressure vessel and to the EC reactor.

Although various embodiments have been shown and described, the invention is not so limited and will be understood to include all such modifications and variations as would be apparent to one skilled in the art.

What is claimed is:

1. An electrocoagulation method for treating wastewater containing contaminants in-solution comprising:
    collecting the wastewater in a closeable container;
    passing the wastewater to a reactor, the reactor having a plurality of positive and negative electrode plates and a plurality of dummy plates interspersed therebetween, the reactor being located inside the container;
    applying a voltage to the positive and negative electrode plates from a DC voltage source to form suspended particles in the wastewater;
    moving the wastewater with the suspended particles from the reactor to a cyclone filter;
    removing the suspended particles from the wastewater by flowing the wastewater through the cyclone filter causing the suspended particles to drop out of the wastewater;
    extracting the suspended particles removed from the wastewater; and
    extracting the treated wastewater.

2. The method of claim 1, in which the step of collecting the wastewater further comprises:
    collecting the wastewater in the container having a pressure vessel adapted to supply pressure external to the reactor that is higher than pressure within the reactor; and
    supplying pressure external to the reactor higher than the pressure within the reactor.

3. The method of claim 1, further comprising: housing the DC voltage source in an explosion proof enclosure.

4. The method of claim 3 further comprising operating the DC electrical power supply by a remote control.

5. The method of claim 1, wherein the step of removing the suspended particles from the wastewater by flowing the wastewater through the cyclone filter further comprises:
    passing the wastewater with suspended particles into an inlet of the cyclone filter;
    passing the wastewater with particles through a distribution channel formed between an outside radius of a ring and a larger radius of a cylindrical chamber;
    passing the wastewater with particles through a plurality of grooves in the ring;
    spiraling the fluid with particles down a downflow annulus formed between a vortex finder tube and an intermediate tube;
    providing a collection chamber having a cylindrical upper portion and a frustoconical lower portion;
    removing the particles from the wastewater by contacting the wastewater with particles with a deflector located within the cylindrical upper portion of the collection chamber, the wastewater reversing direction upon contact with the deflector;
    collecting the particles in the lower cylindrical portion of the collection chamber; and
    expelling the treated wastewater through an outlet at an upper end of the vortex finder tube.

6. The method of claim 5 further comprising: removing the particles via an outlet located at a bottom end of the frustoconical lower portion of the collection chamber.

7. The electrocoagulation method of claims 2, 3, or 5 further comprising:
    supplying the DC voltage source with a rectifier to selectively reverse the polarity of voltage supplied to the electrode plates thus changing the polarity of the electrode plates to allow the electrode plates to deteriorate substantially equally.

8. The electrocoagulation method of claim 7 further comprising:
    interspersing a plurality of dummy plates between the positive and negative electrode plates to increase a flow path through which the wastewater travels through the reactor, the dummy plates creating intermediate voltages therebetween.

9. The electrocoagulation method of claim 8 further comprising: releasing byproduct gasses from the container through a pressure release valve.

10. The electrocoagulation method of claim 9 further comprising:
    measuring the pH of the wastewater entering the container measuring the pH of the wastewater exiting the container; and
    adjusting the flow of wastewater and the DC voltage source to achieve desired pH of wastewater exiting the reactor.

11. An electrocoagulation method for treating wastewater containing contaminants in-solution comprising:
providing an electrocoagulation system having
a closeable container for collecting the wastewater to be treated from a wastewater source,
a reactor having at least one positive electrode plate and at least one negative electrode plate and a plurality of dummy plates interspersed therebetween, the positive electrode plate being substantially parallel to the negative electrode plate, the reactor being located inside the container and in fluid communication with the container to receive the wastewater from the container, the reactor adapted to cause electrocoagulation of the contaminants,
the plates defining a flow path in the reactor through which the wastewater flows,
a DC voltage source in electrical communication with the positive and negative plates for applying a voltage therebetween, the voltage causing the electrodes to ionize and go into solution to interact with the contaminants in the wastewater to change from in-solution to in-suspension in the wastewater,
a cyclone filter for receiving the wastewater and contaminants from the reactor, the cyclone filter separating the contaminants contained in-suspension from the wastewater, and
a controller adapted to control the flow of wastewater from the wastewater source, through the reactor, and into the cyclone filter, the controller controlling the DC voltage source to control the amount of voltage supplied to the electrode plates,
collecting the wastewater in the container;
passing the wastewater from the container to the at least one positive and negative electrode plates and dummy plates;
applying a voltage to the positive and negative electrode plates from a DC voltage source to form suspended particles in the wastewater;
moving the wastewater with the suspended particles from the reactor in the container to the cyclone filter;
removing the suspended particles from the wastewater by flowing the wastewater through the cyclone filter which causes the suspended particles to drop out of the wastewater;
extracting from the cyclone filter the suspended particles removed from the wastewater; and
extracting the treated wastewater.

12. The electrocoagulation method of claim 11 further comprising:
supplying the DC voltage source with a rectifier to selectively reverse the polarity of voltage supplied to the electrode plates thus changing the polarity of the electrode plates to allow the electrode plates to deteriorate substantially equally.

13. The electrocoagulation method of claim 11 further comprising:
creating intermediate voltages between a plurality of dummy plates between the positive and negative electrode plates to increase a flow path through which the wastewater travels through the reactor.

14. The electrocoagulation method of claim 11 further comprising:
release byproduct gasses from the container.

15. The electrocoagulation method of claim 14 further comprising:
measuring the pH of the wastewater entering the container;
measuring the pH of the wastewater exiting the container; and
adjusting the flow of wastewater and the DC voltage source to achieve a desired pH of wastewater exiting the reactor.

16. The method of claim 11, further comprising:
removing byproduct gases from the wastewater.

17. The electrocoagulation method of claim 16 further comprising:
venting gases from the container via a first gas release having manual valves coupled to a first gas release valve on the container; and
releasing gases generated inside the electrocoagulation reactor via a second gas release valve coupled to the container by water outlet piping.

18. The electrocoagulation method of claim 16 further comprising:
measuring the temperature of the wastewater exiting the reactor with a temperature sensor, the temperature sensor in communication with the controller, the controller adjusting the flow of wastewater and the DC voltage source to achieve a desired temperature of wastewater exiting the reactor.

19. The electrocoagulation method of claim 16 further comprising:
measuring the pH of the wastewater entering the container with a first pH sensor; and
measuring the pH of the wastewater exiting the reactor with a second pH sensor, the second pH sensor located between the reactor and the cyclone filter, the first and second pH sensors in communication with the controller; and
adjusting via the controller the flow of wastewater and the DC voltage source to achieve a desired pH of wastewater exiting the reactor.

20. The method of claim 11, further comprising: housing the DC voltage source in an explosion proof enclosure.

21. An electrocoagulation method for treating wastewater containing contaminants in-solution comprising:
providing means for collecting the wastewater;
providing means for passing the wastewater from the means for collecting to a reactor, the reactor having a plurality of positive and negative electrode plates and a plurality of dummy plates interspersed therebetween, the reactor being located inside a closeable container;
the means for collecting having a pressure vessel adapted to supply pressure external to the reactor that is higher than pressure within the reactor;
supplying pressure external to the reactor higher than the pressure within the reactor;
housing a DC voltage source in an explosion proof enclosure, the DC voltage source adapted to apply a voltage to the plurality of positive and negative electrode plates to form suspended particles in the wastewater;
providing means for forming suspended particles in the wastewater;
providing means for moving the wastewater with the suspended particles from the reactor in the means for collecting to a cyclone filter;
removing the suspended particles from the wastewater by flowing the wastewater through the cyclone filter which causes the suspended particles to drop out of the wastewater;
extracting from the cyclone filter the suspended particles removed from the wastewater; and
extracting the treated wastewater.

* * * * *